United States Patent
Bardman et al.

(10) Patent No.: US 6,710,161 B2
(45) Date of Patent: Mar. 23, 2004

(54) POLYMER COMPOSITION AND MONOMER COMPOSITION FOR PREPARING THEREOF

(75) Inventors: James Keith Bardman, Green Lane, PA (US); Ward Thomas Brown, North Wales, PA (US); Gary Robert Larson, Hatfield, PA (US); William Joseph Rosano, Hatboro, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/321,178

(22) Filed: Dec. 17, 2002

(65) Prior Publication Data

US 2003/0236374 A1 Dec. 25, 2003

Related U.S. Application Data

(60) Provisional application No. 60/390,017, filed on Jun. 19, 2002.

(51) Int. Cl.$^7$ .............................................. C08G 79/02
(52) U.S. Cl. ....................... 528/398; 524/126; 524/127; 524/129
(58) Field of Search .......................... 528/398; 524/126, 524/127, 129

(56) References Cited

U.S. PATENT DOCUMENTS 4,733,005 A * 3/1988 Schmidt et al. ............. 560/222
5,922,410 A * 7/1999 Swartz et al. ............... 427/393

* cited by examiner

Primary Examiner—Duc Truong
(74) Attorney, Agent, or Firm—Gary N. Greenblatt

(57) ABSTRACT

A polymer composition is provided including copolymer particles bearing phosphorus acid groups dispersed in an aqueous medium, wherein the polymer composition is substantially-free of water soluble phosphorus acid compounds. Also provided is a monomer composition containing at least one phosphorus acid monomer and a method of preparing the polymer composition from the monomer composition. The monomer composition is substantially-free of inorganic phosphorus acid compounds. A method is provided for applying the polymer composition to a substrate. The polymer composition is useful as a coating composition to prepare coatings for metal substrates, which have improved solvent resistance.

10 Claims, No Drawings

POLYMER COMPOSITION AND MONOMER COMPOSITION FOR PREPARING THEREOF

CROSS REFERENCE TO RELATED PATENT APPLICATIONS

This is a non-provisional application of prior pending U.S. provisional application serial No. 60/390,017 filed Jun. 19, 2002.

This invention relates to a polymer composition containing copolymer particles bearing phosphorus acid groups. The copolymer particles are dispersed in an aqueous medium. The polymer composition is substantially-free of water soluble phosphorus acid compounds. A process is provided for preparing the polymer composition from a monomer composition containing phosphorus acid monomer that is substantially-free of inorganic phosphorus acid compounds. Also provided is the monomer composition and a method of applying the polymer composition to a substrate. The polymer composition of this invention is useful for preparing coatings for metal substrates having improved solvent resistance.

Polymers containing phosphorus acid groups are useful in many applications including coatings and adhesives. The phosphorus acid groups provide improved adhesion of the polymer to metal substrates, form crosslinks in the presence of divalent metal ions, and promote adsorption of the polymer to pigment particles such as titanium dioxide to form composite particles. For example, European Patent Application EP 0 221 498 discloses anti-corrosive random copolymers containing surface-active alkylphosphate monomer as polymerized units. The anti-corrosive random copolymers are useful for preparing coatings that protect substrates from corrosion. However, despite this disclosure, there is a continuing need to provide corrosion resistant coatings with improved solvent resistance.

The inventors have found a polymer composition containing copolymer particles bearing phosphorus acid groups and being substantially-free of water soluble phosphorus acid compounds. The polymer composition is suitable for preparing coatings with improved solvent resistance.

In the first aspect of the present invention, there is provided a polymer composition including copolymer particles bearing first phosphorus acid groups dispersed in an aqueous medium, wherein the copolymer particles contain at least one phosphorus acid monomer as polymerized units; and wherein the polymer composition is substantially-free of water soluble phosphorus acid compounds bearing at least one second phosphorus acid group.

In the second aspect of the present invention, there is provided a process for forming a polymer composition including the steps of preparing an aqueous reaction medium comprising at least one phosphorus acid monomer, wherein the aqueous reaction medium is substantially-free of inorganic phosphorus acid compounds; and polymerizing the aqueous reaction medium to provide the polymer composition.

In the third aspect of the present invention, there is provided a monomer composition including at least one phosphorus acid monomer; wherein the monomer composition is substantially-free of inorganic phosphorus acid compounds.

In the fourth aspect of the present invention, a method is provided for applying a polymer composition including the steps of applying a polymer composition onto a substrate; and drying or allowing to dry the polymer composition; wherein the polymer composition contains copolymer particles bearing first phosphorus acid groups dispersed in an aqueous medium, wherein the copolymer particles contain at least one phosphorus acid monomer as polymerized units; and wherein the polymer composition is substantially-free of water soluble phosphorus acid compounds bearing at least one second phosphorus acid group.

As used herein, the term "(meth)acrylate" refers to either acrylate or methacrylate and the term "(meth)acrylic" refers to either acrylic or methacrylic.

As used herein, the term "phosphorus acid group" refers to a phosphorus oxo acid having a POH moiety in which the hydrogen atom is ionizable. Also included in the term "phosphorus acid group" are salts of the phosphorus oxo acid. In its salt or basic form, the phosphorus acid group has a cation such as a metal ion or an ammonium ion replacing at least one acid proton. Examples of phosphorus acid groups include groups formed from phosphinic acid, phosphonic acid, phosphoric acid, pyrophosphinic acid, pyrophosphoric acid, partial esters thereof, and salts thereof.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The $T_g$ of a polymer phase can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein are calculated based on the Fox equation.

The polymer composition of this invention contains copolymer particles bearing phosphorus acid groups pendant to the polymer backbone. These phosphorus acid groups are referred to herein as "first phosphorus acid groups". The copolymer particles, which are formed from phosphorus acid monomer, are dispersed in an aqueous medium. The copolymer particles are insoluble in the aqueous medium. The polymer composition is further characterized as being substantially-free of water soluble phosphorus acid compounds.

The copolymer particles are addition polymers, which contain as polymerized units, at least one ethylenically unsaturated monomer having a phosphorus acid group, referred to herein as "phosphorus acid monomer" and at least one second ethylenically unsaturated monomer, referred to herein as "comonomer".

The phosphorus acid monomer contains at least one ethylenic unsaturation and a phosphorus acid group. The phosphorus acid monomer may be in the acid form or as a salt of the phosphorus acid group. Examples of phosphorus acid monomers include:

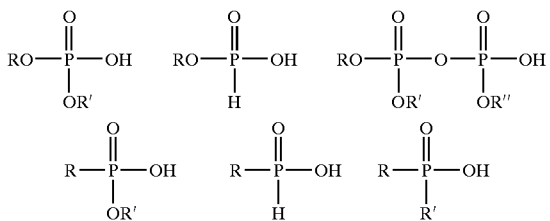

wherein R is an organic group containing an acryloxy, methacryloxy, or a vinyl group; and R' and R" are independently selected from H and a second organic group. The second organic group may be saturated or unsaturated. Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl (meth)acrylates including 2-hydroxyethyl (meth)acrylate, 3-hydroxypropyl (meth)acrylates, and the like. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are 1,2-ethylenically unsaturated (hydroxy)phosphinylalkyl (meth) acrylate monomers, disclosed in U.S. Pat. No. 4,733,005, and include (hydroxy)phosphinylmethyl methacrylate. Preferred phosphorus acid monomers are dihydrogen phosphate monomers which include 2-phosphoethyl (meth)acrylate, 2-phosphopropyl (meth)acrylate, 3-phosphopropyl (meth) acrylate, and 3-phospho-2-hydroxypropyl (meth)acrylate.

The comonomer is an ethylenically unsaturated monomer which is not a phosphorus acid monomer and is copolymerizable with an ethylenically unsaturated phosphorus acid monomer. Suitable comonomers include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1$–$C_{40}$ alkyl esters of (meth)acrylic acid; for example, methyl (meth) acrylate, ethyl (meth)acrylate, n-butyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, lauryl (meth) acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate, alkoxyalkyl (meth)acrylate, such as ethoxyethyl (meth)acrylate, mono-, di-, trialkyl esters of ethylenically unsaturated di- and tricarboxylic acids and anhydrides, such as ethyl maleate, dimethyl fumarate, trimethyl aconitate, and ethyl methyl itaconate; and carboxylic acid containing monomers such as (meth)acrylic acid, itaconic acid, fumaric acid, and maleic acid. The comonomer may also include at least one multiethylenically unsaturated monomer effective to raise the molecular weight and crosslink the copolymer particle. Examples of multiethylenically unsaturated monomers that may be used include allyl (meth)acrylate, tripropylene glycol di(meth)acrylate, diethylene glycol di(meth)acrylate, ethylene glycol di(meth)acrylate, 1,6-hexanediol di(meth) acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

The phosphorus acid monomer and comonomer, and the levels of these monomers may be chosen to provide the polymer composition with desired properties for the intended application.

The copolymer particles may contain as polymerized units, phosphorus acid monomer at a level in the range of 0.1 to 20 weight %, preferably from 0.5 to 10 weight %, and more preferably from 1 to 6 weight %, based on the weight of the copolymer particles. The copolymer particles may contain as polymerized units, at least one comonomer at a level in the range of 80 to 99.9 weight %, preferably 90 to 99.5 weight %, and more preferably, from 94 to 99 weight %, based on the weight of the copolymer particles.

The copolymer particles according to the present invention may have a weight average molecular weight of at least 5,000, preferably at least 50,000, and more preferably, at least 100,000, as measured by gel permeation chromatography.

The $T_g$ of the copolymer particles may be in the range of −60° C. to greater than 120° C. Copolymer particles with $T_g$'s in the range of 0° C. to 80° C. may be employed as binders in coating compositions. Copolymer particles with $T_g$'s of 0° C. or less, in particular in the range of −60° C. to −10° C., are suitable in adhesive compositions.

The copolymer particles may have an average diameter in the range of 10 nm to 20 micron, preferably in the range of 20 nm to 1 micron, and more preferably in the range of 50 nm to 500 nm. The diameters of the copolymer particles may be characterized by distributions such as unimodal or multimodal including bimodal. The average diameter of the copolymer particles may be determined by a light scattering technique such as a quasielastic light scattering technique.

Suitable morphologies for the copolymer particles includes copolymer particles having a single polymer phase and copolymer particles having two or more polymer phases, including for example, core-shell polymers in which a first or shell polymer phase fully encapsulates the second or shell polymer phase. Other morphologies include two-phase copolymer particles having a shell phase which does not fully encapsulate the core phase such as an "acorn" morphology; two-phase polymer particles having a "dipole" morphology in which each phase forms separate but connected lobes; two-phase polymer particles containing separate hemispheres for each polymer phase; two-phase polymer particles having a morphology in which the one polymer phase forms multiple domains within the second polymer phase; and two-phase polymer particles in which one phase forms multiple domains on the surface of the other polymer phase. Suitable shapes for the two-phase copolymer particles include spheres and non-spherical shapes such as an ellipsoids or a rod-like shapes. Preferably the two-phase copolymer particle is spherical. At least one polymer phase of the copolymer particles having two or more polymer phases contains phosphorus acid monomer as polymerized units. Also contemplated are copolymer particles having two or more polymer phases wherein at least two phases contain phosphorus acid monomer as polymerized units.

The polymer composition contains the copolymer particles dispersed in an aqueous medium. The aqueous medium may contain cosolvents including water miscible cosolvents such as methanol, ethanol, propanol, acetone, ethylene glycol ethyl ethers, propylene glycol propyl ethers, and diacetone alcohol; and water immiscible solvents such as propyl acetate, butyl acetate, methyl isoamyl ketone, amyl acetate, diisobutyl ketone, xylene, toluene, butanol, and mineral spirits. The polymer composition may contain from 10 to 70 weight % copolymer particles, based on the weight of the polymer composition. The pH of the polymer composition may be in the range of 2 to 12.

The polymer composition is characterized as being substantially-free of water soluble phosphorus acid compounds. Water soluble phosphorus acid compounds contain phosphorus acid groups, referred to herein as "second phosphorus acid groups". At a pH of 5 and above, the water soluble phosphorus acid compounds are contained as a solubilized component of the aqueous medium. The water soluble phosphorus acid compounds include inorganic phosphorus acid compounds and organic phosphorus acid compounds. Inorganic phosphorus acid compounds include phosphorus oxo acids such as phosphoric acid, phosphorus acid, hydrophosphorous acid, orthophosphoric acid, pyrophosphoric acid, and salts thereof. Organic phosphorus acid compounds contain at least one phosphorus acid group attached to an organic moiety and include both unsaturated organic phosphorus acid compounds such as phosphorus acid monomers; and saturated organic phosphorus acid compounds such as partial esters of phosphorus oxo acids such as $HOCH_2CH_2OP(O)(OH)_2$, methyl phosphonic acid, and water soluble polymer bearing phosphorus acid groups. The water soluble polymer bearing phosphorus acid groups are addition polymers containing at least two phosphorus acid groups that are independently located pendant to the backbone of the water soluble polymer or in a terminal position. The water soluble polymer bearing phosphorus acid groups may be a homopolymer or a copolymer, and has a degree of polymerization of at least 2. As used herein, "saturated phosphorus acid compounds" are compounds selected from inorganic phosphorus acid compounds and saturated organic phosphorus acid compounds. As used herein, "substantially-free of water soluble phosphorus acid compounds" refers to a level of water soluble phosphorus acid compounds in the polymer composition as defined by the ratio of equivalents of second phosphorus acid groups to equivalents of first phosphorus acid groups in a range having an upper value of 0.8, preferably 0.7, and more preferably 0.5; and may have a lower value in the range of 0.1, preferably 0.05, and more preferably zero. In one embodiment, the ratio of equivalents of second phosphorus acid groups to equivalents of first phosphorus acid groups is in the range of less than or equal to 0.8, preferably less than or equal to 0.7, and more preferably less than or equal to 0.5. The first phosphorus acid groups and the second phosphorus acid groups may be the same type of phosphorus acid or may be different; for example, the first phosphorus acid groups may be formed from phosphoric acid and the second phosphorus acid groups may be formed from phosphonic acid.

The ratio of equivalents of second phosphorus acid groups to equivalents of first phosphorus acid groups in the polymer composition is determined by inductively coupled plasma spectroscopy detection of phosphorus atoms. First, the total level of phosphorus atoms in the polymer composition, which includes both the first phosphorus acid groups and the second phosphorus acid groups, is determined by inductively coupled plasma spectroscopy. Next the pH of the polymer composition is adjusted to a pH of at least 5 and the copolymer particles containing the first phosphorus acid groups are separated from the aqueous medium containing the water soluble phosphorus acid compounds. The level of second phosphorus acid groups in the aqueous medium is then determined by the level of phosphorus atoms in the aqueous medium using inductively coupled plasma spectroscopy. The equivalents of first phosphorus acid groups in the copolymer particles are calculated by subtracting the level of second phosphorus acid groups in the aqueous medium from the total level of phosphorus acid groups.

Aqueous emulsion polymerization is suitable for preparing the copolymer particles as an aqueous polymer dispersion. The aqueous emulsion polymerization may be carried out by various procedures such as, for example, with all of the monomer in the reaction kettle at the beginning of the polymerization reaction, with a portion of the monomer in emulsified form present in the reaction kettle at the beginning of the polymerization reaction, with a portion of the monomer in emulsified form present in the reaction kettle, and with a small particle size emulsion polymer seed preset in the reaction kettle at the beginning of the polymerization reaction. Aqueous emulsion polymerization of the phosphorus acid monomer to prepare the copolymer particles contained in the polymer composition of this invention may be conducted in an aqueous reaction medium having a pH of less than or equal to 8, and preferably having a pH of less than or equal to 4. The polymerization process may be conducted as a batch, semicontinuous, or continuous process.

In one embodiment, the copolymer particles are prepared by an aqueous emulsion polymerization process in an aqueous reaction medium having a low pH. As used herein, a low pH is a pH of less than 2, preferably less than or equal to 1.8, and more preferably less than or equal to 1.5. The phosphorus acid monomer may be polymerized at a pH in the range of −1 to less than 2, preferably −1 to less than 1.8, and more preferably, −1 to 1.5. In another embodiment, the phosphorus acid monomer is polymerized at a pH in the range of 0 to 1.8, preferably in the range of 0 to 1.7, and more preferably in the range of 0 to 1.6. The pH of the aqueous reaction medium may be adjusted to a low pH by the addition of strong acids such as sulfuric acid; sulfurous acid; alkyl sulfonic acids such as methylsulfonic acid and alkyl ethylene oxide sulfonic acids; aryl sulfonic acids such as benzosulfonic acid; dodecyl benzene sulfonic acid; and naphthalene sulfonic acid; sulfamic acid; hydrochloric acid; iodic acid; periodic acid; selenic acid; chromic acid; nitric acid; pyrophosphoric acid; trifluoroacetic acid; dichloroacetic acid; trichloroacetic acid; dihydroxymalic acid; dihydroxytartaric acid; maleic acid; oxalic acid; and trihydroxybenzoic acid. Preferred strong acids are sulfuric acid, hydrochloric acid, perchloric acid, and nitric acid. The strong acid may be added to the aqueous reaction medium prior to the addition of the phosphorus acid monomer, or both before and during the addition of the phosphorus acid monomer. Alternatively, the strong acid may be added to the aqueous reaction medium after the addition of the phosphorus acid monomer but prior to the polymerization of the phosphorus acid monomer.

Although not wanting to be limited by theory, the inventors believe that in an aqueous reaction medium having a low pH, the phosphorus acid monomer is protonated and is less water soluble than at higher pH. Polymerization of the protonated phosphorus acid monomer leads to increased incorporation of the phosphorus acid monomer into the growing copolymer particles and a reduction in the formation of water soluble polymer bearing phosphorus acid groups in the aqueous reaction medium.

The pH of the aqueous reaction medium is determined using a pH meter equipped with electrodes such as silver chloride electrodes. The pH measurement may be conducted on the aqueous reaction medium in the reaction vessel or may be conducted on an aliquot of the aqueous reaction medium that has been removed from the reaction vessel. The pH measurement is made with the tested sample of the aqueous reaction medium at 20° C. The pH of the aqueous reaction medium is measured prior to, during, or after the polymerization of the phosphorus acid monomer. A pH measurement after the polymerization of the phosphorus acid monomer is made prior to the addition of substances that change the pH of the aqueous reaction medium.

Suitable emulsion polymerization processes include such processes as single and multiple shot batch processes. If desired, a monomer mixture containing the phosphorus acid monomer may be prepared and added gradually to the reaction vessel. The monomer composition within the reaction vessel may be varied during the course of the polymerization, such as by altering the composition of monomers being fed into the reaction vessel. The monomer mixture may be pre-emulsified prior to addition to the aqueous reaction medium. Surfactant may be used to aid in the pre-emulsification of the monomer mixture. The monomer mixture may also contain water, solvents, defoamers, and strong acids. The aqueous reaction medium may also include water miscible solvents such as methanol, ethanol, propanol, acetone, ethylene glycol ethyl ethers, propylene glycol propyl ethers, and diacetone alcohol; and water immiscible solvents such as propyl acetate, butyl acetate, methyl isoamyl ketone, amyl acetate, diisobutyl ketone, xylene, toluene, butanol, and mineral spirits.

Temperatures suitable for the preparation of the copolymer particles by an aqueous emulsion polymerization process are in the range of 20° C. to less than 100° C., preferably in the range of 40° C. to 95° C., and more preferably in the range of 50° C. to 90° C. The reaction vessel, containing an initial quantity of water and optionally other synthesis adjuvants such as surfactants or acid, may be preheated to determined temperature prior to the addition of the monomer mixture. Typically, the aqueous reaction medium is agitated to promote mixing. The headspace of the reaction vessel may be flushed with nitrogen or another inert gas to minimize the level of oxygen in the reaction vessel. Single or multiple state polymerization techniques may be used.

The polymerization reaction to prepare the copolymer particles may be initiated by a polymerization initiator. Examples of polymerization initiators which may be employed include polymerization initiators which thermally decompose at the polymerization temperature to generate free radicals. Examples include both water-soluble and water-insoluble species. Examples of free radical-generating initiators which may be used include persulfates, such as ammonium or alkali metal (potassium, sodium, or lithium) persulfate; azo compounds such as 2,2'-azobis (isobutyronitrile), 2,2'-azobis(2,4-dimethylvaleronitrile), and t-butyl azocyanocyclohexane; hydroperoxides such as t-butyl hydroperoxide and cumene hydroperoxide; peroxides such as benzoyl peroxide, caprylyl peroxide, di-t-butyl peroxide, ethyl 3,3'-di-(t-butylperoxy) butyrate, ethyl 3,3'-di(t-amulperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl) peroxy dicarbonate; and perphosphates.

Polymerization initiators may be used alone or as the oxidizing component of a redox system, which also includes a reducing component such as ascorbic acid, isoascorbic acid, malic acid, glycolic acid, oxalic acid, lactic acid, thioglycolic acid, or an alkali metal sulfite, more specifically a hydrosulfite, hyposulfite, or metabisulfite, such as sodium hydrosulfite, potassium hyposulfite, and potassium metabisulfite, or sodium formaldehyde sulfoxylate.

The initiator and the optional reducing component may be used in proportions from 0.001% to 5% each, based on the weight of the monomers in the monomer mixture to be polymerized. Accelerators such as chloride and sulfate salts of cobalt, iron, nickel, or copper may be used in small amounts. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be optimized for the catalyst system employed, as is conventional.

Chain transfer agents may be added to the reaction medium containing the phosphorus acid monomer and the optional comonomer to control the molecular weight of the copolymer particles, if desired. Examples of chain transfer agents include mercaptans, polymercaptans, and polyhalogen compounds. Examples of chain transfer agents which may be used include alkyl mercaptans such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptopropionic acid; methyl 3-mercaptopropionate; 2-hydroxyethyl mercaptan; alcohols such as isopropanol, isobutanol, lauryl alcohol, and t-octyl alcohol; halogenated compounds such as carbon tetrachloride, tetrachloroethylene, and trichlorobromoethane. Generally from 0 to 10% by weight, based on the weight of the monomers in the monomer mixture used to prepare the copolymer particles, may be used. The molecular weight of the copolymer particles may be controlled by other techniques known in the art, such as selecting the ratio of the initiator to total monomer amount.

Catalyst and/or chain transfer agent may be dissolved or dispersed in separate or the same fluid medium and gradually added to the polymerization vessel. Monomer, either neat or dissolved or dispersed in a fluid medium, may be added simultaneously with the catalyst and/or the chain transfer agent.

The copolymer particles may be polymerized in the presence of surfactants. Surfactants may also be added to the polymer composition after the polymerization of the copolymer particles. In the preparation of the polymer composition in the form of an aqueous dispersion, surfactants are useful for stabilizing growing copolymer particles during polymerization and to discourage aggregation of the copolymer particles in the resulting aqueous dispersion. One or more surfactants such as anionic or nonionic surfactant, or a mixture thereof, may be used. Many examples of surfactant suitable for emulsion polymerization are given in *McCutcheon's Detergents and Emulsifiers* (MC Publishing Co. Glen Rock, NF), published annually.

Suitable anionic surfactants include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium octyl phenoxypolyethoxyethyl sulfate, having 1 to 5 oxyethylene units. Suitable nonionic surfactants include, for example, alkyl phenoxypolyethoxy ethanols having alkyl groups of from 7 to 18 carbon atoms and from 6 to 60 oxyethylene units such as, for example, heptyl phenoxypolyethoxyethanols; ethylene oxide derivatives of long chained carboxylic acids such as lauric acid, myristic acid, palmitic acid, oleic acid, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyvinyl alcohol may be used.

The polymer composition of this invention may be prepared by various processes including processes that remove the water soluble phosphorus acid compounds from a composition containing the copolymer particles, processes that prepare the copolymer particles in an aqueous reaction medium substantially-free of inorganic phosphorus acid compounds, processes that prepared the copolymer particles without the concomitant formation of water soluble phosphorus acid compounds, or a combination of these processes.

The water soluble phosphorus acid compounds may be removed from an aqueous composition containing the copolymer particles dispersed in an aqueous medium by first adjusting the pH of the aqueous medium to a value of 3 or greater. Next, the insoluble copolymer particles and the aqueous medium are separated by a suitable technique, such as filtration or centrifugation. Then, the copolymer particles are redispersed into water. This process may be repeated one or more times to provide the polymer composition of this invention. Alternately, water soluble phosphorus acid compounds may be removed from the aqueous medium by diafiltration. Another method to remove the water soluble phosphorus acid compounds is treatment of the aqueous composition with a suitable ion exchange resin.

The copolymer particles contained in the polymer composition of this invention may be prepared by polymerization of an aqueous reaction medium that is substantially-free of inorganic phosphorus acid compounds. In this process, an aqueous reaction medium is prepared containing at least one phosphorus acid monomer and is substantially-free of inorganic phosphorus acid compounds. As used herein "substantially-free of inorganic phosphorus acid compounds" refers to a level of inorganic phosphorus acid compounds defined by a ratio of equivalents of phosphorus acid groups for the inorganic phosphorus acid compounds to equivalents of phosphorus acid groups for the phosphorus acid monomer in a range having an upper value of 0.2, preferably 0.15, and more preferably 0.1; and a lower value of 0.01, preferably 0.001, and more preferably zero. In one embodiment, the ratio of equivalents of phosphorus acid groups for the inorganic phosphorus acid compounds to equivalents of phosphorus acid groups for the phosphorus acid monomer is in the range of less than or equal to 0.2, preferably less than or equal to 0.15, and more preferably less than or equal to 0.1. In one embodiment of this polymerization process, the phosphorus acid monomer is treated prior to polymerization to remove inorganic phosphorus acid compounds and optionally other nonpolymerizable phosphorus acid compounds. Examples of these inorganic phosphorus acid compounds that may be found as impurities in phosphorus acid monomers include inorganic phosphorus acid compounds such as phosphoric acid, pyrophosphoric acid, and salts of these acids. The inorganic phosphorus acid compounds may be separated from the phosphorus acid monomer by techniques such as solvent extraction.

The treated phosphorus acid monomer may be provided as a purified monomer composition containing at least one phosphorus acid monomer and that is further defined as substantially-free of inorganic phosphorus acid compounds.

The ratio of equivalents of phosphorus acid groups for the inorganic phosphorus acid compounds to equivalents of phosphorus acid groups for the phosphorus acid monomer in the purified monomer composition or in the aqueous reaction mixture is determined using phosphorus-31 nuclear magnetic resonance spectroscopy, as described in Example 1.

The copolymer particles may also be prepared by processes that minimize the formation of water soluble phosphorus acid compounds such as a low pH aqueous polymerization process that prepares the copolymer particles while minimizing formation of water soluble polymer bearing phosphorus acid groups. In one embodiment, the copolymer particles are prepared by polymerization of purified phosphorus acid monomer using a low pH aqueous polymerization process.

In one embodiment, the polymer composition contains a total level of phosphorus acid groups of the phosphoric acid, pyrophosphoric acid, and salts thereof in the range of 0 to 0.2 equivalents, preferably 0 to 0.1 equivalents, and more preferably 0 to 0.05 equivalents, based on the equivalents of first phosphorus acid groups.

In one embodiment of the present invention, the copolymer particles have aldehyde reactive group-containing monomer as copolymerized units. Polymer compositions containing these copolymer particles, which have aldehyde reactive groups, are useful for preparing dry coatings having improved adhesion to substrates. The copolymer particles may contain from 0.1 to 12.5% by weight aldehyde reactive group-containing monomer, based on the weight of the copolymer particles. By "aldehyde reactive group-containing monomer" is meant herein a monomer which, in a homogeneous solution containing 20% by weight of the monomer and an equimolar amount of formaldehyde at any pH from 1 to 14, will exhibit greater than 10% extent of reaction between the monomer and formaldehyde on a molar basis in one day at 25° C. Included as ethylenically unsaturated aldehyde reactive group-containing monomers are, for example, vinyl acetoacetate, acetoacetoxyethyl (meth)acrylate, acetoacetoxypropyl (meth)acrylate, allyl acetoacetate, acetoacetoxybutyl (meth)acrylate, 2,3-di (acetoacetoxy)propyl (meth)acrylate, vinyl acetoacetamide, acetoacetoxyethyl (meth)acrylamide, 3-(2-vinyloxyethylamino)-propionamide, N-(2-(meth) acryloxyethyl)-morpholinone-2, 2-methyl-1-vinyl-2-imidazoline, 2-phenyl-1-vinyl-2-imidazoline, 2-(3-oxazolidinyl)ethyl (meth)acrylate, N-(2-vinoxyethyl)-2-methyloxazolidine, 4,4-dimethyl-2-isopropenyloxazoline, 3-(4-pyridyl)propyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth)acrylate, 2-(meth) acryloxyethyldimethyl-β-propiobetaine, diethanolamine monovinyl ether, o-aniline vinyl thioether, (meth) acryloxyacetamido-ethylethyleneurea, ethyleneureidoethyl (meth)acrylate, (meth)acrylamidoethyl-ethyleneurea, (meth) acrylamidoethyl-ethylenethiourea, N-((meth) acrylamidoethyl)-N-(1-hydroxymethyl)ethyleneurea, N-((meth)acrylamidoethyl)-N-(1-methoxy) methylethyleneurea, N-formamidoethyl-N-(1-vinyl) ethyleneurea, N-vinyl-N-(1-aminoethyl)-ethyleneurea, N-(ethyleneureidoethyl)-4-pentenamide, N-(ethylenethioureido-ethyl)-10-undecenamide, butyl ethyleneureido-ethyl fumarate, methyl ethyleneureido-ethyl fumarate, benzyl N-(ethyleneureido-ethyl) fumarate, benzyl N-(ethyleneureido-ethyl) maleamate, N-vinoxyethyl-ethylene-urea, N-(ethyleneureidoethyl)-crotonamide, ureidopentyl vinyl ether, 2-ureidoethyl (meth)acrylate, N-2-(allylcarbamoto)aminoethyl imidazolidinone, 1-(2-((2-hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, 2-(3-methylolimidazolidone-2-yl-1)ethyl acrylate, N-acryloxyalkyl oxazolidines, acylamidoalkyl vinyl alkyleneureas, aldehyde-reactive amino group-containing monomers as dimethyaminoethyl methacrylate, and ethylenically unsaturated monomers containing aziridene functionality. Preferred is 0.25% to 5%, by weight based on total monomer weight, of a copolymerized ethylenically-unsaturated aldehyde reactive group-containing monomer, based on the weight of the copolymer particles. In an alternative embodiment, the copolymer particles contain a sufficient amount of copolymerized monomer(s) having select reactive functionality that is not reactive with aldehydes. During or after polymerization, the select reactive group is reacted to form aldehyde reactive groups. The copolymer particles may be prepared with 0.1–12.5% by weight copolymerized aldehyde-reactive monomer equivalent, based on the weight of the copolymer particles. By "copolymerized aldehyde-reactive monomer equivalent" is meant herein the copolymerized monomer which leads to the copolymer particles having aldehyde reactive groups even though the copolymer particles were formed by a post-polymerization reaction rather than directly formed by the copolymerization of ethylenically-unsaturated aldehyde reactive group-containing monomer. In this embodiment, for example, the reaction product of polymers containing carboxylic acid functionality with compounds consisting of or containing an aziridine (ethyleneimine) ring or rings may be formed. Substitution on the ring may be on the nitrogen and/or either or both carbons such as, for example, ethyleneimine, propyleneimine, N-(2-hydroxyethyl) ethyleneimine, trimethylolpropane-tris-($\beta$-(N-aziridinyl) propionate), and pentaerythritol trimethylolpropane-tris-($\beta$-(N-aziridinyl) propionate). Also, polymers containing $\beta$-aminoester and/or $\beta$-hydroxyamide functionality may be formed by post-polymerization processes.

A method is also provided from improving the adhesion of a dry coating, including the steps of: a) forming a polymer composition containing copolymer particles bearing first phosphorus acid groups dispersed in an aqueous medium, wherein the copolymer particles contain at least one phosphorus acid monomer and at least one aldehyde reactive groups-containing monomer, as polymerized units; b) applying the polymer composition to a substrate; and c) drying or allowing to dry, the applied polymer composition.

In one embodiment, the polymer composition of this invention also contains a polyvalent metal ion. A polyvalent metal compound may be included in the polymer composition to provide the polyvalent metal ion. The polyvalent ion may associate with the first phosphorus acid groups to provide crosslinking to a film or coating prepared from the polymer composition. The polyvalent ion has an oxidation state of +2 or greater and includes divalent ions, trivalent ions, and tetravalent ions. Suitable ions include $Zn^{+2}$, $Ca^{+2}$, $Mg^{+2}$, $Cu^{+2}$, $Co^{+2}$, $Cr^{+2}$, $Cr^{+3}$, $Fe^{+2}$, $Fe^{+3}$, and $Zr^{+4}$. Preferred ions are $Zn^{+2}$, $Ca^{+2}$, and $Mg^{+2}$. Examples of suitable polyvalent metal compounds include zinc compounds such as zinc oxide, zinc acetate, zinc borate, zinc phosphate, zinc molybdate, zinc halides such as zinc bromate, zinc bromide, and zinc chloride, zinc citrate, zinc lactate, zinc salicylate, zinc sulfate, and zinc sulfite; calcium compounds such as calcium hydroxide, calcium chloride, calcium nitrite, calcium molybdate, and calcium barium phosphosilicate; magnesium compounds such as magnesium oxide, magnesium tetroxide, magnesium sulfate, magnesium chloride, magnesium orthophosphate, magnesium stearate, and magnesium phosphate; zirconium oxide; nickel carbonate; copper sulfate; zinc aluminum phosphate, zinc molybdenum phosphate, zinc phosphate silicate, calcium aluminum phosphates, zinc calcium aluminum strontium phosphate silicate, zinc calcium molybdate, zinc calcium phosphomolybdate, strontium aluminum phosphates, and zinc magnesium phosphate. Other examples of suitable polyvalent metal compounds include polyvalent metal ions complexed with a volatile chelating agent such as, for example, volatile ammonia, amines, $\beta$-ketoesters, $\beta$-diketones, and acryl acetone. Other suitable polyvalent metal compounds include polyvalent metal ions complexed with ligands such as ammonium carbonate complexes of zinc or zirconium, such as Zinplex™ 15 solution (Zinplex is a trademark of Ultra Additives Corp). In the polymer composition, the ratio of equivalents of metal ion to total equivalents of first phosphorus acid groups may be in the range of greater than 0.25 to 3.0, preferably in the range of 0.5 to 2.0, and more preferably in the range of 0.7 to 1.5.

The polymer composition of the present invention is useful as a composition having a low volatile organic (VOC) content, which contains less than 5% VOC by weight based on the weight of the polymer composition; more preferably the polymer composition contains less than 3% VOC by weight based on the weight of the polymer composition; even more preferably the polymer composition contains less than 1.7% VOC by weight based on the weight of the polymer composition. A volatile organic compound ("VOC") is defined herein as a carbon containing compound that has a boiling point below 280° C. at atmospheric pressure, compounds such as water and ammonia being excluded from VOCs.

A "low VOC" polymer composition herein is the polymer composition of the present invention that contains less than 5% VOC by weight based on the weight of the polymer composition; preferably it contains between 0.01% and 1.7% by weight based on the weight of the polymer composition.

Frequently a VOC is deliberately added to a paint or coating to improve the film properties of a dried coating or to aid in the application properties of the composition employed to prepare the dried coating. Examples are glycol ethers, organic esters, aromatic compounds, ethylene and propylene glycol, and aliphatic hydrocarbons. It is preferred that the polymer composition contains less than 5% by weight based on the weight of the polymer composition of the added VOCs and more preferably less than 1.7% by weight based on the weight of the polymer composition of the added VOCs.

Additionally, the low VOC polymer composition may contain coalescing agents which are not VOCs. A coalescing agent is a compound that is added to a water-borne emulsion polymer, paint or coating and which reduces the minimum film forming temperature (MFFT) of the emulsion polymer, paint or coating by at least 1° C. The MFFT is measured using ASTM test method D2354. Examples of coalescing agents that are not VOCs include plasticizers, low molecular weight polymers, and surfactants. That is, a non-VOC coalescing agent is a coalescing agent which has a boiling point above 280° C. at atmospheric pressure.

Typical methods of paint or coating preparation may introduce adventitious VOCs from the emulsion polymer such as the aqueous dispersion containing the copolymer particles bearing first phosphorus acid groups, biocides, defoamers, soaps, dispersants, and thickeners. These typically account for 0.1% VOC by weight based on the weight of the polymer composition. Additional methods such as steam stripping and choice of low VOC containing additives like biocides, defoamers, soaps, dispersants, and thickeners can be used to further reduce the polymer composition to less than 0.01% VOC by weight based on the weight of the polymer composition.

Composite particles are pigment particles surrounded by a plurality of copolymer particles. In one embodiment of this invention, a composite particle composition is formed from the polymer composition containing the copolymer particles. The copolymer particles are adsorbed to the surface of each pigment particle and minimize contact between adjacent pigment particles. The copolymer particles may fully cover the surface of the pigment particle to provide an encapsulating layer or may partially cover the pigment particle surface. The composite particles are useful for providing coatings with increased levels of hiding compared to coating containing equivalent levels of pigment particles but do not contain composite particles.

Composite particles containing the copolymer particles may be prepared with pigment particles such as zinc oxide pigments, antimony oxide pigments, barium pigments, calcium oxide pigments, zirconium oxide pigments, chromium oxide pigments, iron oxide pigments, magnesium oxide pigments, lead oxide pigments, zinc sulfide, lithopone, and phthalo blue. In one embodiment, the composite particles are prepared from clay particles such as kaolin or delaminated clay particles and copolymer particles adsorbed to the clay particles. In another embodiment, the composite particles are prepared from calcium carbonate particles and copolymer particles adsorbed to the calcium carbonate particles. Preferably, the pigment particles are titanium dioxide and more preferably, the pigment particles are rutile titanium dioxide. The pigment particles may be uncoated or coated with a conventional pigment coating.

The composite particles may include copolymer particles with a single polymer phase or two-phase copolymer particles that have the phosphorus acid groups in one or more phases in contact with the exterior of the copolymer particle. In one embodiment, the composite particle contains two-phase copolymer particles having one polymer phase that does not completely encapsulate the second polymer phase.

The composite particle may contain copolymer particles having a weight average molecular weight of at least 50,000, preferably of at least 250,000, and more preferably of at least 500,000, as measured by gel permeation chromatography. These copolymer particles may have an average particle diameter in the range of 10 nm to 1000 nm, preferably in the range of 75 nm to 500 nm, and more preferably in the range of 80 nm to 200 nm. For composite particles containing titanium dioxide as the pigment particle or other pigment particles of similar size, maximum hiding power is typically obtained with copolymer particles having average diameters in the range of 40 nm to 250 nm, preferably in the range of 50 nm to 200 nm, and more preferably in the range of 80 nm to 150 nm. The glass transition temperature of these copolymer particles may be in the range of −60° C. to 120° C. Preferably the copolymer particles have glass transition temperatures of at least 20° C., more preferably at least 35° C., and most preferably at least 50° C.

The composite particle composition including the composite particles containing the copolymer particles may be prepared by first admixing a first aqueous medium containing a dispersion of pigment particles, the copolymer composition containing the copolymer particles, and optionally dispersant. Next, the copolymer particles are allowed sufficient time to adsorb to the pigment particles to form the composite particles. The adsorption of the copolymer particles to the pigment particles is believed to be spontaneous and will continue until the copolymer particles are completely adsorbed to the surfaces of the pigment particles, the surfaces of the pigment particles are completely covered with copolymer particles, or until an equilibrium is achieved between adsorbed copolymer particles and copolymer particles remaining dispersed in the aqueous medium of the composite particle composition. The time required for the completion of adsorption may depend upon the pigment particle type, the surface treatment of the pigment particle, dispersant type and concentration, the concentrations of the pigment particles and the copolymer particles, and temperature. The adsorption may be complete upon admixing of the first aqueous medium and the copolymer dispersion, or may require further time. Mixing the aqueous medium containing the pigment particles and the copolymer particles may reduce the time for the completion of adsorption. For composites prepared with titanium dioxide particles as the pigment particles, adsorption of the copolymer particles typically required 4 hours for complete adsorption. Low levels of other components may be present in the aqueous medium during the formation of the composite particle provided these components do not substantially inhibit or substantially interfere with the adsorption of the copolymer particle to the pigment particle. Examples of other components include cosolvents; wetting agents; defoamers; surfactants; biocides; other polymers; and other pigments. Preferably the composite particle is formed in an aqueous medium in the absence of other polymers and other pigments.

In one embodiment, the composite particles are prepared by adding the first aqueous medium containing a dispersion of pigment particles to the copolymer composition, so that situations in which there is a temporary "excess" of pigment particles relative to the copolymer particles, and the possibility of grit formation through bridging flocculation of the copolymer particles by the excess of pigment particles, may be avoided.

The composite particle composition including the composite particles containing the copolymer particles, may also be prepared by first preparing the polymer composition and then dispersing pigment particles into the aqueous medium of the polymer composition. The aqueous medium may optionally contain dispersant. The composite particles are formed by allowing the copolymer particles to adsorb onto the pigment particles.

The composite particle composition includes an optional dispersant. The dispersant may be added at levels which do not inhibit or prevent the adsorption of the copolymer particle to the pigment particle. The composite particle may be prepared with levels of dispersant in the range of 0 to 2 weight %, preferably 0 to 1 weight %, and more preferably 0 to 0.5 weight %, based on the weight of the pigment particle. Suitable dispersants include anionic polyelectrolyte dispersants such as copolymerized maleic acid, copolymers including copolymerized acrylic acid, copolymers including copolymerized methacrylic acid, and the like; or carboxylic acids containing molecules such as tartaric acid, succinic acid, or citric acid.

The pH of the composite particle composition may be in the range of 3 to 10. For polymer compositions containing composite particles having titanium dioxide as the pigment particle, the pH is typically in the range of 7 to 10.

Other components may be added to the polymer composition or the composite particle composition. For examples, a second polymer may be included as a binder in a composite particle composition suitable as a coating formulation for coating substrates. The second polymer may be film forming at application conditions such as second polymer having a minimum film formation temperature at or below the application temperature. Other suitable second polymers include polymer particles with minimum film formation temperatures above the application temperature which may also include coalescents or plasticizers to provide the polymer particles with effective minimum film formation temperatures at or below the application temperature. In addition, the polymer composition or the composite particle composition may include other optional components, including without limitation, other polymers, surfactants, extenders, pigments and dyes, pearlescents, adhesion promoters, crosslinkers, dispersants, defoamers, leveling agents, optical brighteners, ultraviolet stabilizers, coalescents, rheology modifiers, preservatives, biocides, and antioxidants. Further, the polymer composition may also include other pigments, including plastic pigments such as solid bead pigments and microsphere pigments containing voids or vesicles, and inorganic pigments. Examples of solid bead pigments include polystyrene and polyvinyl chloride beads. Examples of microsphere pigments, which include polymer particles containing one or more voids and vesiculated polymer particles, are disclosed in U.S. Pat. Nos. 4,427,835; 4,920,160; 4,594,363; 4,469,825; 4,468,498; 4,880,842; 4,985,064; 5,157,084; 5,041,464; 5,036,109; 5,409,776; and 5,510,422. The level of plastic pigments in the polymer composition may be varied to optimize a particular property in the dried coating, such as hiding, whiteness, gloss, or any combination of properties.

The polymer composition may be free of organic solvent or may contain a coalescing solvent. The polymer composition may contain typical coating additives such as binders, fillers, defoamers, crosslinking agents, catalysts, surfactants, stabilizers, anti-flocculants, aqueous or non-aqueous solutions or dispersions of other polymers, tackifiers, coalescents, colorants, waxes, antioxidants, pigments, and suitable solvents, such as water miscible solvents.

The polymer composition of this invention and the composite particle composition may be applied by methods well known in the art such as air-assisted spray, airless spray, plural component spray, brush, roller squeegee, roll coater, curtain coater, and the like. Substrates to which the polymer composition of this invention may be applied include, for example, timber such as cedar, pine, teak, oak, maple, and walnut; processed timber including medium density fiber board, chip board, and laminates; mineral substrates including but not limited to masonry, concrete, stucco, fiber, mortar, cement, cement asbestos, plaster, plasterboard, glazed and unglazed ceramic; metal including but not limited to galvanized iron, galvanized steel, cold rolled steel, aluminum, wrought iron, drop forged steel, and stainless steel; previously painted or primed surfaces (fresh, aged, or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; synthetic substrates including but not limited to polyvinyl chloride, polyvinylidene chloride, polyethylene, and polypropylene; asphalt; cellulosic substrates such as paper, paperboard, wallpaper, and wallboard; glass; leather; and woven and nonwoven material such as cloth, wool, synthetic and natural fiber, and textiles. The polymer composition may be used, for example, as a wood coating, maintenance coating, interior or exterior wall coating, metal primer or coating, plastic coating, traffic paint, woven or nonwoven textile saturant or coating, leather coating, coil coating, architectural coating, mastic, sealant, caulk, board coating, paper coating, plastics coating, ink, overcoat varnish, flooring coating, and adhesive. Coatings prepared from the polymer composition may be clear coatings, flat coatings, satin coatings, semi-gloss coatings, gloss coatings, primer, textured coatings, and the like.

After the polymer composition is applied to a substrate, the polymer composition may be dried or allowed to dry. Heat may be applied to dry the polymer composition. Suitable temperatures for drying include temperatures in the range of 5° C. to 100° C.

The following examples are presented to illustrate the invention and the results obtained by the test procedures. The following abbreviations were used in the examples:

| | |
|---|---|
| surfactant-A | surfactant having an average composition of lauryl-(ethylene oxide)$_4$ sodium sulfate; 30 wt % solids |
| g | grams |
| ml | milliliters |

EXAMPLE 1

Purification of Phosphoethyl Methacrylate Monomer

A sample of unpurified phosphoethyl methacrylate (PEM) containing 20 weight % free phosphoric acid was purified by first adding 350 g of a saturated aqueous sodium chloride solution (5.3 M NaCl), 200 g unpurified phosphoethyl methacrylate, and 270 g butyl acetate to a 1 liter separatory funnel. The mixture was shaken for 1 to 2 minutes and then allowed to separate into two phases. The lower aqueous phase was drained from the separatory funnel. The organic top phase was then transferred to a container. Next, 10 g magnesium sulfate was added to the organic phase and the organic phase was mixed for 10 minutes. The organic phase was then filtered to remove the magnesium sulfate. The butyl acetate was removed from the organic phase on a Buchii Rota-Evaporator to yield the purified monomer composition of Example 1.

The level of saturated phosphorus acid compounds in the purified monomer composition of Example 1 was determined using phosphorus-31 nuclear magnetic resonance spectroscopy ($P^{31}$ NMR). First, a solution was prepared by mixing 0.1 g of the purified monomer composition of Example 1 in 0.5 g tetrahydrofuran-d$_8$. The $P^{31}$ NMR spectrum was measured using proton decoupling. The ratio of the inorganic phosphorus acid compounds to unsaturated phosphorous acid compounds was determined by dividing the area of the inorganic phosphorus acid peaks by the area of the unsaturated phosphorus acid peaks. The unsaturated phosphorous acid peaks were the major peaks in the regions of 1.79 to 2.16 ppm and 0.36 to 0.81 ppm. The inorganic phosphorus acid peaks were 2.93 to 3.29 ppm for phosphoric acid and 3.11 to 3.5 for pyrophosphoric acid. The chemical shifts were relative to a 85 weight % phosphoric acid external standard.

The ratios of equivalents of phosphorus acid groups of the inorganic phosphorus acid compounds to equivalents of phosphorus acid groups of the phosphoethyl methacrylate monomer were determined to be 0.084 for the purified monomer composition of Example 1 and 1.17 for the unpurified phosphoethyl methacrylate.

EXAMPLE 2

Preparation of Polymer Composition

A monomer emulsion was prepared by mixing 365.2 g deionized water, 49.5 g surfactant A, 608.7 g ethylhexyl acrylate, 462.5 g styrene, 72.2 g purified phosphoethyl methacrylate of Example 1, and 728.9 g methyl methacrylate. The container used to weigh the monomers was rinsed with 65 g deionized water, which was then added to the monomer emulsion.

The reactor was a 5-liter, four necked round bottom flask equipped with a paddle stirrer, a thermometer, nitrogen inlet, and a reflux condenser. To the flask was added 1222 g deionized water and 3.0 g surfactant A. The contents of the flask were heated to 89° C. under a nitrogen atmosphere. Next, 122.7 g of the monomer emulsion was added to the flask followed by a rinse of 33.5 g deionized water. This was followed by the addition of a solution containing 4.4 g ammonium persulfate dissolved in 47.8 g deionized water, and a rinse of 28.7 g of deionized water. After stirring the contents of the flask for 15 minutes, the remaining monomer emulsion and an initiator solution containing 3.0 g ammonium persulfate in 109.9 g deionized water were added linearly and separately to the flask over a period of 1.5 to 4 hours. The contents of the flask were maintained at a temperature of 89° C. during the addition of the monomer emulsion. When all additions were complete, the containers containing the monomer emulsion and the initiator solution were rinsed with 74.6 g deionized water, which was then added to the flask. Next, the flask was cooled to 60° C. and a catalyst/activator pair was added to the contents of the flask. Aqueous ammonia (29%) was added to raise the pH to 8. The polymer composition of Example 2 was an aqueous polymer dispersion containing copolymer particles with an average particle diameter of 119 nm, and had a solids content of 44.0 weight %. The purified phosphoethyl methacrylate was polymerized at a pH above 2. The ratio of equivalents of the second phosphorus acid groups of the water soluble phosphorus acid compound to equivalents of the first phosphorus acid groups of the copolymer particles was 0.27 for the polymer composition of Example 2.

EXAMPLE 3

Preparation of Polymer Composition by a Low pH Process

A monomer emulsion (ME) was prepared by mixing 365.2 g deionized water, 38.2 g surfactant A, 608.7 g ethylhexyl acrylate, 462.5 g styrene, 72.2 g purified phosphoethyl methacrylate of Example 1, and 728.9 g methyl methacrylate. The container used to weigh the monomers was rinsed with 65 g water, which were then added to the monomer emulsion.

The polymer composition was prepared according to the process of Example 2 except that 1222 g deionized water, 14.9 g surfactant A, and 5.5 g sulfuric acid was initially added to the flask. The pH of the contents of the flask at the start of the polymerization process was 1.35. After completion of the polymerization process, aqueous ammonia (29%) was added to raise the pH to 8.9. The polymer composition of Example 3 was an aqueous polymer dispersion containing copolymer particles with an average particle diameter of 139 nm, and had a solids content of 43.6 weight %. The purified phosphoethyl methacrylate was polymerized at a pH below 2. The ratio of equivalents of the second phosphorus acid groups of the water soluble phosphorus acid compound to equivalents of the first phosphorus acid groups of the copolymer particles was 0.25 for the polymer composition of Example 3.

COMPARATIVE A

Preparation of Comparative Polymer Composition

A monomer emulsion was prepared by mixing 365.2 g deionized water, 49.4 g surfactant A, 608.7 g ethylhexyl acrylate, 462.5 g styrene, 42.5 g unpurified phosphoethyl methacrylate, and 736.4 g methyl methacrylate.

The comparative polymer composition was prepared according to the process of Example 2. The resulting comparative polymer composition of Comparative A was an aqueous polymer dispersion containing copolymer particles with an average particle diameter of 113 nm, had a solids content of 44.1 weight %, and a pH of 8.1. The unpurified phosphoethyl methacrylate was polymerized at a pH above 2. The ratio of equivalents of the second phosphorus acid groups of the water soluble phosphorus acid compound to equivalents of the first phosphorus acid groups of the copolymer particles was 0.93 for the comparative polymer composition of Comparative A.

COMPARATIVE B

Preparation of Comparative Polymer Composition by a Low pH Process

A monomer emulsion was prepared by mixing 365.2 g deionized water, 38.2 g surfactant A, 608.7 g ethylhexyl acrylate, 462.5 g styrene, 42.5 g unpurified phosphoethyl methacrylate, and 736.4 g methyl methacrylate.

The comparative polymer composition was prepared according to the process of Example 3. The resulting comparative polymer composition of Comparative B was an aqueous polymer dispersion containing copolymer particles with an average particle diameter of 120 nm, had a solids content of 44.1 weight %, and a pH of 8.8. The unpurified phosphoethyl methacrylate was polymerized at a pH below 2. The ratio of equivalents of the second phosphorus acid groups of the water soluble phosphorus acid compound to equivalents of the first phosphorus acid groups of the copolymer particles was 0.90 for the comparative polymer composition of Comparative B.

EXAMPLE 4

Preparation of Coating Compositions and Coated Samples

An aqueous titanium dioxide dispersion was prepared from the materials listed in Table 4.1. The materials were mixed under high shear to form an aqueous titanium dioxide dispersion.

TABLE 4.1

Materials for Preparing Aqueous Titanium Dioxide Dispersion

| Material | Weight |
|---|---|
| Water | 40.0 g |
| Dowanol ™ DPM coalescent | 20.0 g |
| Tamol ™ 681 dispersant | 9.0 g |
| Drewplus ™ L-493 defoamer | 1.0 g |
| Triton ™ CF-10 surfactant | 2.0 g |
| Ammonia (28%) | 1.0 g |
| Ti-Pure ™ R-706 titanium dioxide | 210.4 |

Dowanol is a trademark of Dow Chemical Company; Tamol is a trademark of Rohm and Haas Company; Drewplus is a trademark of Drew Industrial Div., Ashland Chemical Industries; Triton is a trademark of Union Carbide; and Ti-Pure is a trademark of E.I. DuPont DeNemours Co.

Coating compositions were prepared by combining the materials listed in Table 4.2. The coating compositions and comparative coating compositions were made at 18 pigment volume concentration (PVC) and 35% volume solids.

TABLE 4.2

Materials for Preparing Coating Compositions

| Material | Coating 4.1 | Coating 4.2 | Comparative Coating C | Comparative Coating D |
|---|---|---|---|---|
| Example 2 | 587.1 g | — | — | — |
| Example 3 | — | 592.9 g | — | — |
| Comparative A | — | — | 585.6 g | — |
| Comparative B | — | — | — | 585.7 g |
| water | 32.8 g | 27.2 g | 34.2 g | 34.2 g |
| ammonia (14%) | 1.0 g | 1.0 g | 1.0 g | 1.0 g |
| aqueous titanium dioxide dispersion | 283.4 g | 283.4 g | 283.4 g | 283.4 g |
| Texanol ™ coalescent | 38.7 g | 38.7 g | 38.7 g | 38.7 g |
| methanol | 35.0 g | 35.0 g | 35.0 g | 35.0 g |
| propylene glycol | 10.0 g | 10.0 g | 10.0 g | 10.0 g |
| sodium nitrate (15% aqueous solution) | 9.0 g | 9.0 g | 9.0 g | 9.0 g |
| Acrysol ™ RM-8W rheology modifier | 3.0 g | 3.0 g | 3.0 g | 3.0 g |

Texanol is a trademark of Eastman Chemical Co.

Acrysol is a trademark of Rohm and Haas Company

The coating compositions and the comparative coating composition were applied to cold rolled steel panels with a wet thickness of 381 microns (15 mils) using a draw down bar. The coated panels were dried at 25° C. and 55% relative humidity for 4 hours, then dried in a 60° C. oven for one hour, and after removal from the oven, allowed to sit for 24 hours at 25° C. and 55% relative humidity.

EXAMPLE 5

Testing of Coating Samples and Comparative Coated Samples

The solvent resistance of the coated samples was characterized using the MEK rub test and the 30 minute MEK spot test.

The MEK rub test was conducted using ASTM D5402-93 (Assessing the Solvent Resistance of Organic Coatings Using Solvent Rubs). The test was conducted using a Crockmeter described in ASTM standard test method F-1319-94 and methyl ethyl ketone (MEK) as the solvent. An acceptable level of solvent resistance was at least 70 repetitions.

The 30 minute MEK spot test was conducted by saturating a 25mm fiber filter (Gelman Sciences, Ann Arbor, Mich.) with 5 ml of methyl ethyl ketone (MEK). The saturated fiber filter was place on the coated sample and covered. After 30 minutes, the fiber filter was removed from the coated sample. The region of the coated sample that was in contact with the MEK was evaluated visually.

TABLE 5.1

Solvent Resistance of Coated Samples and Comparative Coated Samples

| Coated Sample | MEK Rub Test | 30 Minute MEK Spot Test |
|---|---|---|
| Coating 4.1 | 91 | dulling of coating |
| Coating 4.2 | 280 | slight dulling of coating |
| Comparative Coating C | 8 | dissolution of coating |
| Comparative Coating D | 15 | blistering and softening of coating |

The results in Table 5.1 show that the coatings prepared from polymer compositions of this invention, which are substantially-free of nonpolymerizable phosphorus acid groups, had significantly increased solvent resistance compared to coatings prepared from comparative polymer compositions containing nonpolymerizable phosphorus acid groups. In particular, Coatings 4.1–4.2 had acceptable levels of solvent resistance as measured by the MEK rub test while the comparative coatings, Comparative Coatings C and D, had unacceptable levels. Further, the 30 minute MEK spot test showed that the comparative coatings were subject to damage to the coating, such as dissolution or blistering of the film, while the coatings prepared from polymer compositions of this invention maintained film integrity.

The results also showed that the preparation of the polymer composition using a low pH process resulted in further increases in solvent resistance compared to both the comparative coatings and the polymer composition prepared by a convention process.

We claim:

1. A polymer composition comprising:

a) copolymer particles bearing first phosphorus acid groups dispersed in an aqueous medium, wherein said copolymer particles comprise at least one phosphorus acid monomer as polymerized units; and wherein said polymer composition is substantially-free of water soluble phosphorus acid compounds bearing at least one second phosphorus acid group.

2. The polymer composition according to claim 1 having a ratio of equivalents of said second phosphorus acid groups to equivalents of said first phosphorus acid groups of less than or equal to 0.7.

3. The polymer composition according to claim 1 or claim 2 wherein said copolymer particles comprise as polymerized units:

a) 0.1 to 20 weight % of said at least one phosphorus acid monomer; and b) 80 to 99.9 weight % of at least one comonomer; based on the weight of said copolymer particles.

4. The polymer composition according to claim 1 wherein said copolymer particles are prepared by polymerization of said at least one phosphorus acid monomer in an aqueous reaction medium having a pH of less than 2.

5. A process for forming a polymer composition comprising the steps of:

a) preparing an aqueous reaction medium comprising at least one phosphorus acid monomer, wherein said aqueous reaction medium is substantially-free of inorganic phosphorus acid compounds; and b) polymerizing said aqueous reaction medium to provide said polymer composition.

6. The process according to claim 5 having a ratio of equivalents of phosphorus acid groups of said inorganic phosphorus acid compounds to equivalents of phosphorus acid groups of said phosphorus acid monomer of less than or equal to 0.15.

7. The process according to claim 6 wherein the pH of said aqueous reaction medium is less than 2.

8. A monomer composition comprising:

a) at least one phosphorus acid monomer; wherein said monomer composition is substantially-free of inorganic phosphorus acid compounds.

9. The monomer composition according to claim 8 having a ratio of equivalents of phosphorus acid groups of said inorganic phosphorus acid compounds to equivalents of phosphorus acid groups of said phosphorus acid monomer of less than or equal to 0.15.

10. A method for applying a polymer composition comprising the steps of:
a) applying a polymer composition onto a substrate; and
b) drying or allowing to dry said polymer composition;
wherein said polymer composition comprises copolymer particles bearing first phosphorus acid groups dispersed in an aqueous medium,
wherein said copolymer particles comprise at least one phosphorus acid monomer as polymerized units; and
wherein said polymer composition is substantially-free of water soluble phosphorus acid compounds.

* * * * *